(12) United States Patent
Ashley et al.

(10) Patent No.: US 9,232,267 B2
(45) Date of Patent: Jan. 5, 2016

(54) DYNAMICALLY CONSTRUCTING A BROADCAST MULTIPLEX

(75) Inventors: Alex Ashley, Redhill Surrey (GB); Pete Rai, Egham Surrey (GB); Trevor Smith, Middlesex (GB); James Geoffrey Walker, Winchester Hampshire (GB); Simon John Parnall, Kingswood Surrey (GB); Ray Taylor, Hook Hampshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 492 days.

(21) Appl. No.: 13/393,574

(22) PCT Filed: Jun. 29, 2010

(86) PCT No.: PCT/IB2010/052960
§ 371 (c)(1),
(2), (4) Date: Aug. 2, 2012

(87) PCT Pub. No.: WO2011/030236
PCT Pub. Date: Mar. 17, 2011

(65) Prior Publication Data
US 2012/0307840 A1 Dec. 6, 2012

(30) Foreign Application Priority Data

Sep. 8, 2009 (GB) .................................. 0915556.5

(51) Int. Cl.
*H04N 21/4385* (2011.01)
*H04N 21/2343* (2011.01)
(Continued)

(52) U.S. Cl.
CPC ....... *H04N 21/4385* (2013.01); *H04N 21/2389* (2013.01); *H04N 21/23608* (2013.01); *H04N 21/23655* (2013.01); *H04N 21/234327* (2013.01)

(58) Field of Classification Search
None
See application file for complete search history.

(56) References Cited

U.S. PATENT DOCUMENTS

| 6,049,551 A | 4/2000 | Hinderks et al. |
| 2002/0181484 A1 | 12/2002 | Aimoto |

(Continued)

FOREIGN PATENT DOCUMENTS

| EP | 1 811 726 A2 | 1/2007 |
| EP | 1 811 726 A2 | 7/2007 |

(Continued)

OTHER PUBLICATIONS

Search Report in Application No. PCT/IB2010/052960 Filed Jun. 29, 2010.

(Continued)

*Primary Examiner* — Diane Lo
(74) *Attorney, Agent, or Firm* — Ladas & Parry LLP (57) ABSTRACT

A method and apparatus for dynamically constructing a broadcast multiplex are described. The method includes: receiving metadata associated with a first plurality of events on a plurality of source channels, the metadata including, at least, scheduling metadata; determining, on the basis of a rule-set applied to the metadata, whether events of the first plurality of events are to be included in the multiplex, thereby producing a second plurality of events to be included in the multiplex; for each one event of the second plurality of events, assigning a multiplex priority to the one event, the multiplex priority being a priority the one event is to be assigned in the multiplex in case the one event contends for space in the multiplex with a second event of the second plurality of events; copying events from the second plurality of events into the multiplex in dependence on the multiplex priorities of events in the second plurality of events; and broadcasting the multiplex. Related systems, apparatus, and methods are also described.

13 Claims, 7 Drawing Sheets

(51) Int. Cl.
*H04N 21/236* (2011.01)
*H04N 21/2365* (2011.01)
*H04N 21/2389* (2011.01)

(56) References Cited

U.S. PATENT DOCUMENTS

| | | | |
|---|---|---|---|
| 2004/0160960 A1 | 8/2004 | Monta et al. | |
| 2005/0281253 A1* | 12/2005 | Veijalainen et al. | 370/363 |
| 2006/0232706 A1 | 10/2006 | Curet et al. | |
| 2007/0171928 A1* | 7/2007 | Kim et al. | 370/412 |
| 2008/0163311 A1* | 7/2008 | St. John-Larkin | 725/68 |
| 2010/0138870 A1* | 6/2010 | Anthru et al. | 725/54 |

FOREIGN PATENT DOCUMENTS

| | | |
|---|---|---|
| GB | 2 351 891 A | 1/2001 |
| GB | 2 351 891 | 8/2003 |
| GB | 2 408 433 | 5/2005 |
| GB | 2 408 433 A | 5/2005 |
| GB | 2462732 A | 2/2010 |
| GB | 2462732 | 11/2010 |
| WO | 99/55092 | 10/1999 |
| WO | 2009/020492 A2 | 2/2009 |

OTHER PUBLICATIONS

ETSI TS 102 323 Digital Video Broadcasting:Carriage and Signalling of TV-Anytime Information in DVB Transport Streams.
ETSI TS 102 822-3-1 (V1.1.1.) 2003 Broadcast and On-Line Services:Search, Select and Rightful Use of Content on Personal Storage Systems ("TV-Anytime Phase 1"); Part 3 Metadata; Sub-Part 1 : Metadata Schemas.
Examination Report dated Apr. 11, 2014 for Application No. EP 10 734 323.8.

* cited by examiner

DYNAMICALLY CONSTRUCTING A BROADCAST MULTIPLEX

RELATED APPLICATION INFORMATION

This application is a 371 of International Application PCT/IB2010/052960 filed 29 Jun. 2010 "DYNAMICALLY CONSTRUCTING A BROADCAST MULTIPLEX", which was published in the English language on 17 Mar. 2011, with International Publication Number 2011/030236 A1, and which claims priority from Great Britain Patent Application 0915556.5, filed 8 Sep. 2009, the content of which is incorporated herein by reference.

The present invention relates to a method and apparatus for dynamically constructing a broadcast multiplex.

BACKGROUND OF THE INVENTION

Multiplexing (also known as muxing) is a process where multiple analog message signals or digital data streams are combined into one signal over a shared medium. In digital television and digital radio systems, Digital Broadcast Multiplexes are well known entities that have been in existence for many years. These multiplexes exploit the fact that digital platforms have sufficient signal bandwidth to offer several channels (services) of programming within a single transmission. This transmission can then be de-multiplexed (unmixed) at the reception point to allow specific channels to be viewed or recorded. Existing standards, such as those published by the Digital Video Broadcasting Project (DVB) and the Advanced Television Systems Committee (ATSC), specify in detail how these multiplexes work and how they fit into a larger broadcasting system.

Typically, digital broadcasting systems pack services such as source channels into multiplexes based upon coarse level parameters. Examples of such parameters are:

Longstanding contractual arrangements—for example, a large operator may have been sold an entire multiplex in order for them to make available a range of services;

To ensure a consistency of access to a set of services—for example, services which are being made available in the same region (or other similar criteria) may be placed within the same multiplex; and Optimization of available capacity—for example, a multiplex may contain a mixture of high definition, standard definition and audio services which collectively make best use of the available bandwidth.

This service level of decision making behind the construction of multiplexes can generally be analyzed manually, by-hand as a one-off activity when the capacity is first brought on-stream. Hence, service level multiplex construction tends to be a legacy decision made at some point in the past.

The data flowing out of a Digital Broadcast Multiplex can also be subject to another established algorithm called Statistical Multiplexing in which service level parameters are varied in order to maintain a predefined goal when changes are made to the inputs of the multiplex. Most commonly, the quality of a target service may be maintained by balancing the target service quality against the quality of other services in view of dynamic changes in the complexity of each service. Commonly, statistical multiplexing algorithms in a digital broadcast environment alter the bandwidth allocated to services in order to more optimally pack them into the multiplex.

The following references are believed to represent the state of the art:

United Kingdom Patent GB 2 351 891 to NDS Limited;
United Kingdom Patent Application GB 2 408 433 to Nokia Corporation;
European Patent Application EP 1 811 726 to Alcatel USA Sourcing, L.P.;
United States Patent Application US 2006/0232706 to Curet et al.; and
International Patent Application. WO 99/55092 to Tiernan. Communications, Inc.

SUMMARY OF THE INVENTION

There is thus provided in accordance with an embodiment of the present invention a method for dynamically constructing a broadcast multiplex, the method including: receiving metadata associated with a first plurality of events on a plurality of source channels, the metadata including, at least, scheduling metadata; determining, on the basis of a rule-set applied to the metadata, whether events of the first plurality of events are to be included in the multiplex, thereby producing a second plurality of events to be included in the multiplex; for each one event of the second plurality of events, assigning a multiplex priority to the one event, the multiplex priority being a priority the one event is to be assigned in the multiplex in case the one event contends for space in said multiplex with a second event of the second plurality of events; copying events from the second plurality of events into the multiplex in dependence on the multiplex priorities of events in the second plurality of events; and broadcasting the multiplex.

Further, in accordance with an embodiment of the present invention, the method further includes discarding an event which has been deferred for inclusion in the multiplex as a result of a contention for space in the multiplex.

Still further, in accordance with an embodiment of the present invention, the method further includes time-slipping an event which has been deferred for inclusion in the multiplex as a result of a contention for space in the multiplex into a later occurring gap in the multiplex.

Additionally, in accordance with an embodiment of the present invention, the copying events from the second plurality of events into the multiplex includes constructing pseudo-channels from events from the second plurality of events and multiplexing the pseudo-channels thereby producing a multiplex of pseudo-channels; and the broadcasting includes broadcasting the multiplex of pseudo-channels.

Moreover, in accordance with an embodiment of the present invention, the multiplex of pseudo-channels is received by a client device such that each of the second plurality of events on a pseudo-channel in the multiplex of pseudo-channels is received on at least one channel of the plurality of source channels prior to the broadcasting of the multiplex of pseudo-channels.

Further, in accordance with an embodiment of the present invention, the rule-set includes requests from an author of the rule-set for specific events of the first plurality of events to be included in the multiplex.

Still further, in accordance with an embodiment of the present invention, the rule-set includes requests that all events on a specific source channel and/or all events scheduled for broadcast between certain times be included in the multiplex.

Additionally, in accordance with an embodiment of the present invention, the rule-set includes requests that all events of a specified genre, or all events in a specified series, or all events associated with specified proceedings, or all live broadcast events be included in the multiplex.

There is also provided in accordance with a further embodiment of the present invention apparatus for dynamically constructing a broadcast multiplex, the apparatus including: receiving means for receiving metadata associated with a first plurality of events on a plurality of source channels, the metadata including, at least, scheduling metadata; determining means for determining, on the basis of a rule-set applied to the metadata, whether events of the first plurality of events are to be included in the multiplex, thereby producing a second plurality of events to be included in the multiplex; assigning means for assigning, for each one event of the second plurality of events, a multiplex priority to the one event, the multiplex priority being a priority the one event is to be assigned in the multiplex in case the one event contends for space in the multiplex with a second event of the second plurality of events; copying means for copying events from the second plurality of events into the multiplex in dependence on the multiplex priorities of events in the second plurality of events; and broadcasting means for broadcasting the multiplex.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
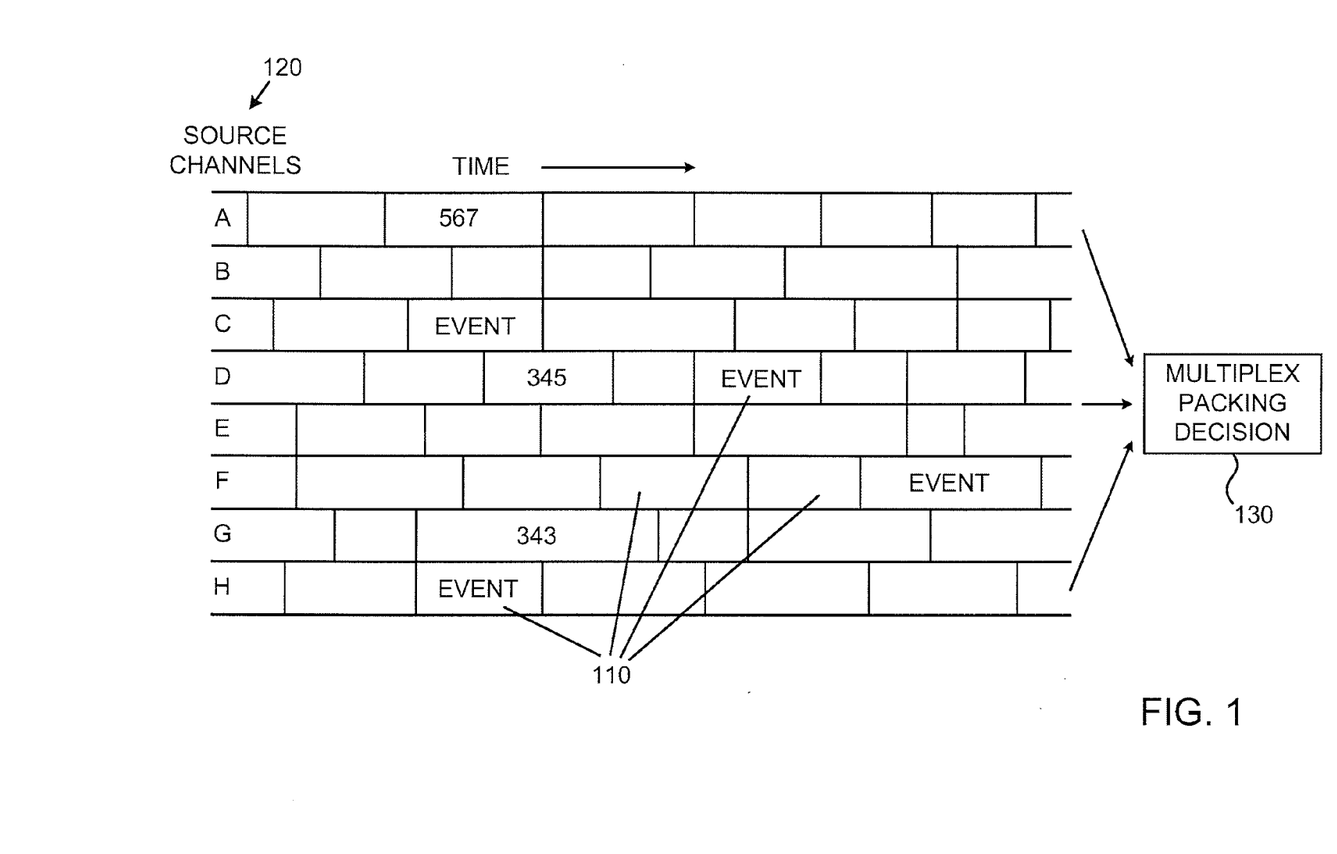
FIG. 1 is a simplified depiction of a plurality of events comprised on a plurality of source channels being input into a multiplex packing decision unit, the multiplex packing decision unit constructed and operative in accordance with an embodiment of the present invention.

Reference is now made to FIG. 1, which is a simplified depiction of a plurality of events 110 comprised on a plurality of source channels (services) 120 being input into a multiplex packing decision unit 130, the multiplex packing decision unit constructed and operative in accordance with an embodiment of the present invention. The system of FIG. 1 comprises source channels 120 comprising the plurality of events 110, and the multiplex packing decision unit 130, and a multiplexer (MUX—not depicted).

The term "event" as used in the present specification and claims herein is understood to mean a collection comprising encoded video, encoded audio, and/or other encoded bit streams in PES (Packetized Elementary Stream) packets which are carried in a sequence of PES packets with one and only one stream_id, all of the members of the collection having a common time base, an associated start time, and an associated end time. Events are sub-service entities in that they are building blocks of services. Services are the inputs into digital broadcast multiplexes.

Events are delivered, in embodiments of the present invention, to the client device in parallel in a dynamically constructed multiplex. The dynamic multiplex described herein is constructed to provide a communications channel for transmitting the events to client devices in a timely manner in order to realize specific end-user experiences requested by the channel or platform (e.g. instant restart or catch-up services).

Client devices receiving the dynamically constructed multiplex thereby receive a plurality of events (and associated metadata) the details of which were not published in a schedule before reception of those events. The events will have been dynamically inserted into the multiplex by an algorithm which the client device typically cannot predict. Furthermore, the events received in the multiplex may be delivered in pieces (or chunks), which the client device is able to concatenate back together to form a complete event (as described in United Kingdom Patent Application GB 2 462 732). Moreover, multiple events may be delivered in parallel to a client device. Events received as part of the dynamically constructed multiplex may be delivered at any time from the point at which they were broadcast on their source channels/services. These above mentioned factors mean that it is not desirable or expected that end-users of the client devices will tune directly to any services received as part of the dynamically constructed multiplex. Rather, the expectation is that client devices capture these services and events for later presentation to end-users through a suitable user interface.

By placing selected events in a dynamically constructed multiplex, an end user device with a single tuner can acquire all of the events in the multiplex on a rolling basis, since a single tuner is operable to receive an entire multiplex, and all of the services/events on that multiplex can be decoded, stored, etc. This effectively gives users of the end user device a multi-event review buffer, enabling the users, for example, to restart a live event which the user joined some time after broadcast of the live event has started. Thus the dynamically constructed multiplex does not need a schedule to be published for users to discover content available on the multiplex. Rather, users continue to discover events in the context of the event's original source channel, the end user device recognizing that the same event is available on the dynamic multiplex, and therefore exposing the features enabled by the presence of the event on the multiplex (e.g. restart of live television).

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

The multiplex packing decision unit 130 is operative to make dynamic packing decisions about individual events in a plurality of events 110 scheduled for broadcast on the plurality of source channels (services) 120.

The multiplex packing decision unit 130 has access to data streams that make up the plurality of source channels 120. Further, the multiplex packing decision unit 130 has access to accurate schedule information (for example, information available from a head-end schedule database (e.g. Stream-server™ available from NDS Limited, UK)), which allows the multiplex packing decision unit 130 to know when specific events scheduled for broadcast on the source channel (service) are starting and stopping.

Those skilled in the art will appreciate that a high level of event signaling, as described above is not unprecedented in digital broadcast headends. One existing use-case is the accurate time-synchronized launching of interactive applications (e.g. the use of an Application Information Table (AIT) or Extended Application Information Table (XAIT) in Open-Cable™ Application Platform (OCAP™)) in launching an interactive application.

The multiplex packing decision unit 130 is also provided with access to sufficient information in the form of metadata about the events on the source channel (such as metadata defined in European Telecommunications Standard Institute (ETSI) Technical Specification (TS) 102 323 "Digital Video Broadcasting (DVB); Carriage and signalling of TV-Anytime information in DVB transport streams" and also in ETSI TS 102 822-3-1 "Broadcast and On-line Services: Search, select, and rightful use of content on personal storage systems ("TV-Anytime"); Part 3: Metadata; Sub-part 1: Phase 1—Metadata schemas") such that the multiplex packing decision unit 130 is able to make appropriate decisions about whether plurality of events 110 comprised on a plurality of source channels 120 are to be included in a multiplex.

The multiplex packing decision unit 130 comprises a configurable set of rules enabling the multiplex packing decision unit 130 to determine which of the plurality of events 110 is to be included in the multiplex, and thereby produce a second plurality of events to be included in the multiplex. For individual events of the second plurality of events, the rule-set assigns a multiplex priority to the individual event. In order to assign a multiplex priority, the rule-set uses the metadata about the plurality of events 110 comprised on the plurality of source channels 120.

It is appreciated that priority is an arbitrary value, and may be priority 1, 2, and 3, where 3 is either the highest or the lowest priority, and 1 the opposite. Alternatively, priority may be set to high, low, or medium. Priority is typically used to determine, as explained below, precedence, should there be contention between two events (i.e. competition between events for space in the multiplex).

Figure 2:
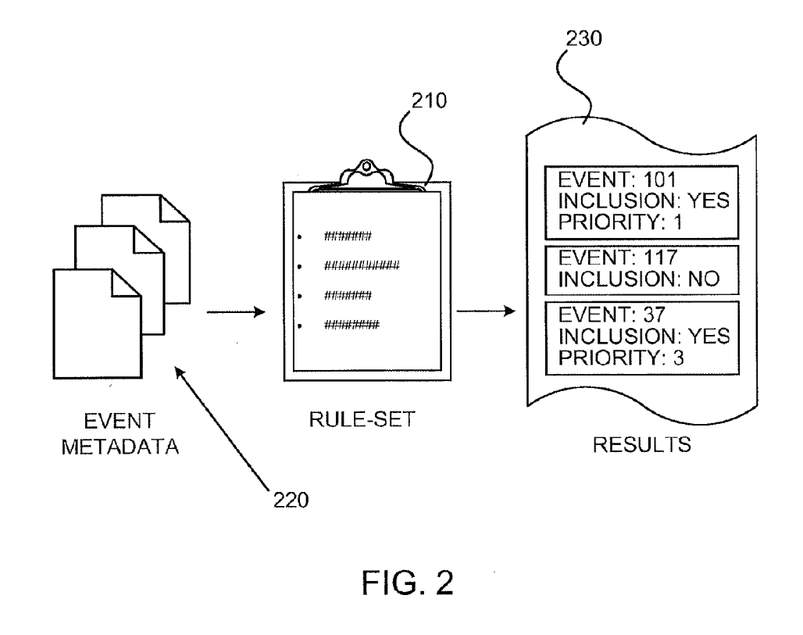
FIG. 2 is a simplified depiction of a rule set being applied resulting in packing decisions in the system of FIG. 1.

Reference is now additionally made to FIG. 2, which is a simplified depiction of a rule-set 210 being applied to event metadata. 220 resulting in packing decisions 230 in the system of FIG. 1.

One implementation of the rule-set 210 may comprise a rule-set 210 comprising direct requests (from the author of the rule-set (e.g. the channel operator or platform operator)) for inclusion of specific events by the channel or platform with explicit priorities for specific events. Event metadata 220 is evaluated according to the rule-set 210 in order to determine which events are to be included in the multiplex. Based on the results of the determining, events are included in the multiplex (or not), and, if included in the multiplex, the included events are assigned a priority.

An alternative implementation of the rule-set may comprise a rule-set comprising fairly coarse metadata related to channels and/or times. For example, and without limiting the generality of the foregoing, all events on a specific channel, or all events scheduled for broadcast between certain times, or all events on a specific channel and scheduled for broadcast between certain times may be signaled for inclusion. Event metadata 220 is evaluated according to the rule-set 210 in order to determine the channel and/or scheduled broadcast time of events. Based on the results of the determining, events are included in a multiplex (or not), and, if included in the multiplex, the included events are assigned a priority.

Still another alternative implementation of the rule-set may comprise a rule-set comprising fine grained, event level metadata. For example, and without limiting the generality of the foregoing, all events of a certain genre may be included, or all events in a specified series (e.g. Star Trek), or all events associated with specified proceedings (e.g. Olympic Games) may be included—or perhaps all live broadcast events may be signaled for inclusion. Event metadata 220 is evaluated according to the rule-set 210 in order to determine, for example, the genre of events or which events are scheduled for live broadcast. Based on the results of the determining, events are included in a multiplex (or not), and, if included in the multiplex, the included events are assigned a priority.

Whatever the criteria comprised in the rule-set 210, the rule-set 210 is configured and installed into the multiplex packing decision unit 130 and the multiplex packing decision unit 130 is able to implement the rules comprised in the rule-set 210 on a per-event basis in order to determine whether events should be included in the multiplex, and if so, with what priority should the events be included in the multiplex.

Looking at the example in FIG. 2, the resulting packing decisions 230 include: for event 101 inclusion in the multiplex with a priority of 3; for event 117 no inclusion in the multiplex; and for event 37 inclusion in the multiplex with a priority of 1.

Figure 3:
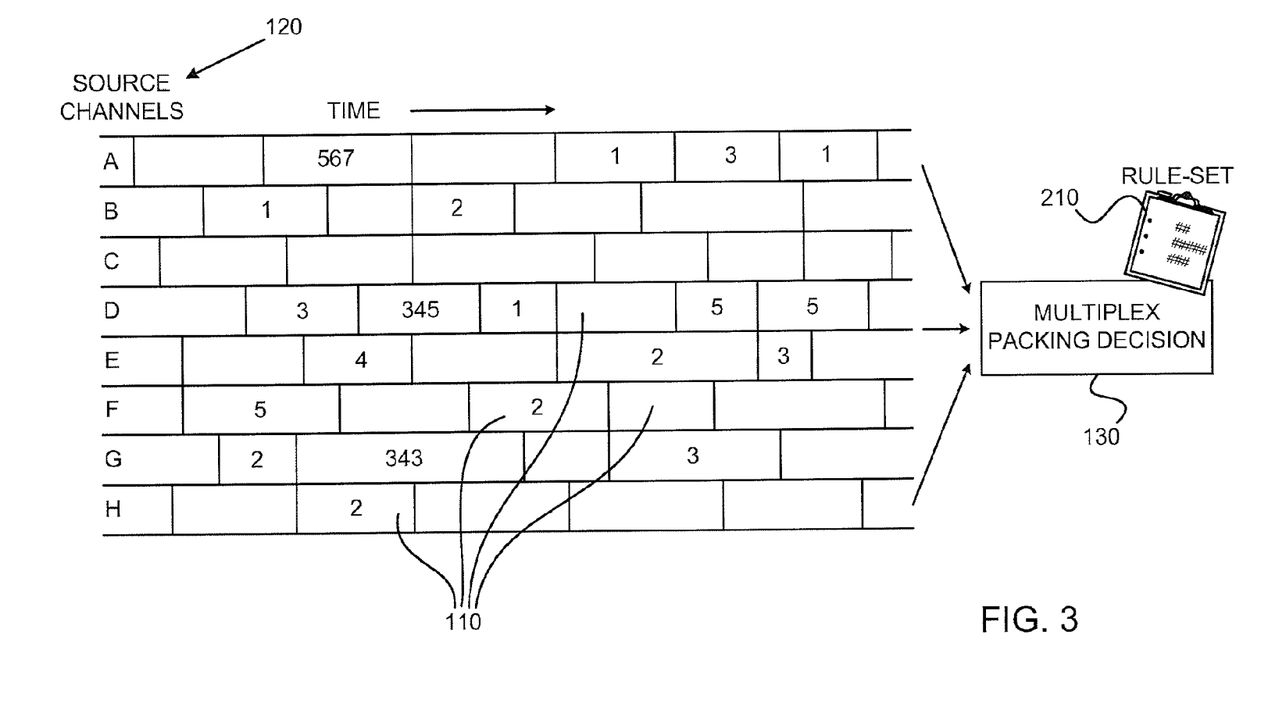
FIG. 3 is a simplified depiction of a rule set being applied to events in order to discover inclusion indicators and priorities in the system of FIG. 1.

Reference is now additionally made to FIG. 3, which is a simplified depiction of the rule-set being applied to events 110 in order to discover inclusion indicators and priorities in the system of FIG. 1.

The multiplex packing decision unit 130 continuously applies the configurable rule-set 210 across events 110 on the source channels 120. The multiplex packing decision unit 130 applies the rule-set 210 such that the multiplex packing decision unit 130 has enough time to process the source channels 120 and copy specific events into a multiplex when the copied events begin (i.e. at the moment when the scheduled broadcast of the events begin). Single digit numbers in the events 110 depicted in FIG. 3 indicate a priority with which the rule-set 210 will assign the various events 110 to be included in the multiplex.

Figure 4:
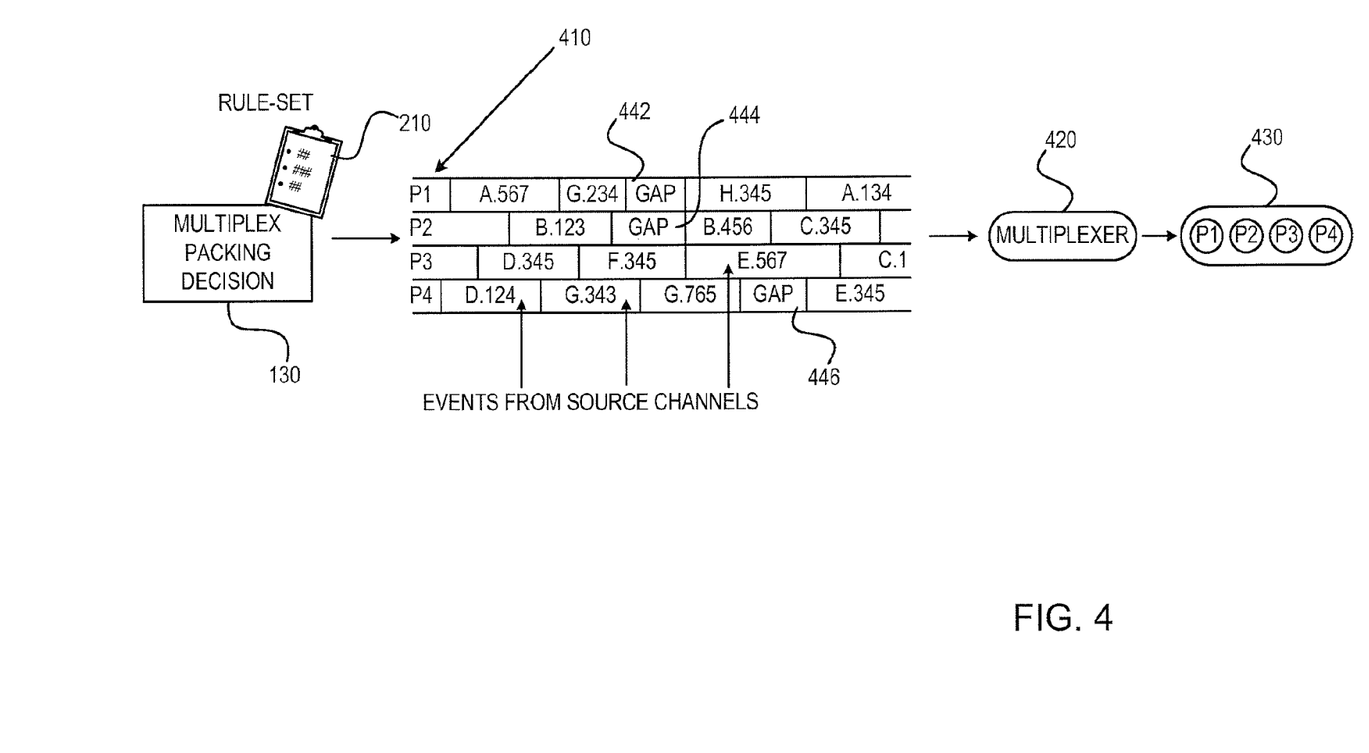
FIG. 4 is a simplified depiction of using source events from the system of FIG. 1 to construct pseudo-channels.

Reference is now additionally made to FIG. 4, which is a simplified depiction of using source events from the source channels 120 of the system of FIG. 1 to construct pseudo-channels 410. Pseudo-channels 410 comprise channels that are constructed for the purpose of carrying events in the dynamic multiplex and that are not accessible by an end-user in the same sense as normal branded television channels.

Once the multiplex packing decision unit 130 identifies events that are to be included in the dynamic multiplex, the multiplex packing decision unit 130 copies the identified events from the source channels into the dynamic multiplex at the correct time (i.e. at the time the identified event starts to be broadcast). The events that are to be included in the dynamic multiplex are identified in FIG. 4, for example and without limiting the generality of the foregoing, as A.567, indicating event number 567 from the source channel 120 labeled, in FIG. 1, as A. Likewise, event number D.345 corresponds to event 345 from the source channel 120 labeled, in FIG. 1, as D. Similarly, event number G.343 corresponds to event 343 from the source channel 120 labeled, in FIG. 1, as G.

Typically, the multiplex packing decision unit 130 copies the identified events at the correct time (i.e. at the time the identified event starts to be broadcast) by constructing one or more pseudo-channels 410, labeled in FIG. 4 as P1, P2, P3, and P4. The pseudo-channels are constructed by the multiplex packing decision unit 130 from source events 110, such as events A.567, D.345, and G.343, which are comprised on the source channels 120. The pseudo-channels 410 are hard-wired into the multiplexer 420 (i.e. they are pre-defined at system installation). The pseudo-channels 410 are in turn multiplexed by the multiplexer 420 into a dynamic multiplex 430 of pseudo-channels, which is then sent for broadcast by the multiplexer 420.

It is appreciated that the decision as to which events 110 are to be instantiated on which pseudo-channels 410 is likely to be based upon standard priority based packing methods (e.g. The Knapsack (or rucksack) problem as described at http://en.wikipedia.org/wiki/Knapsack_problem). In cases where the number of source events is sparse, "gaps" 442, 444, 446 might result in the pseudo-channels. A gap is a portion of a pseudo-channel on which no event is instantiated.

Figure 5:
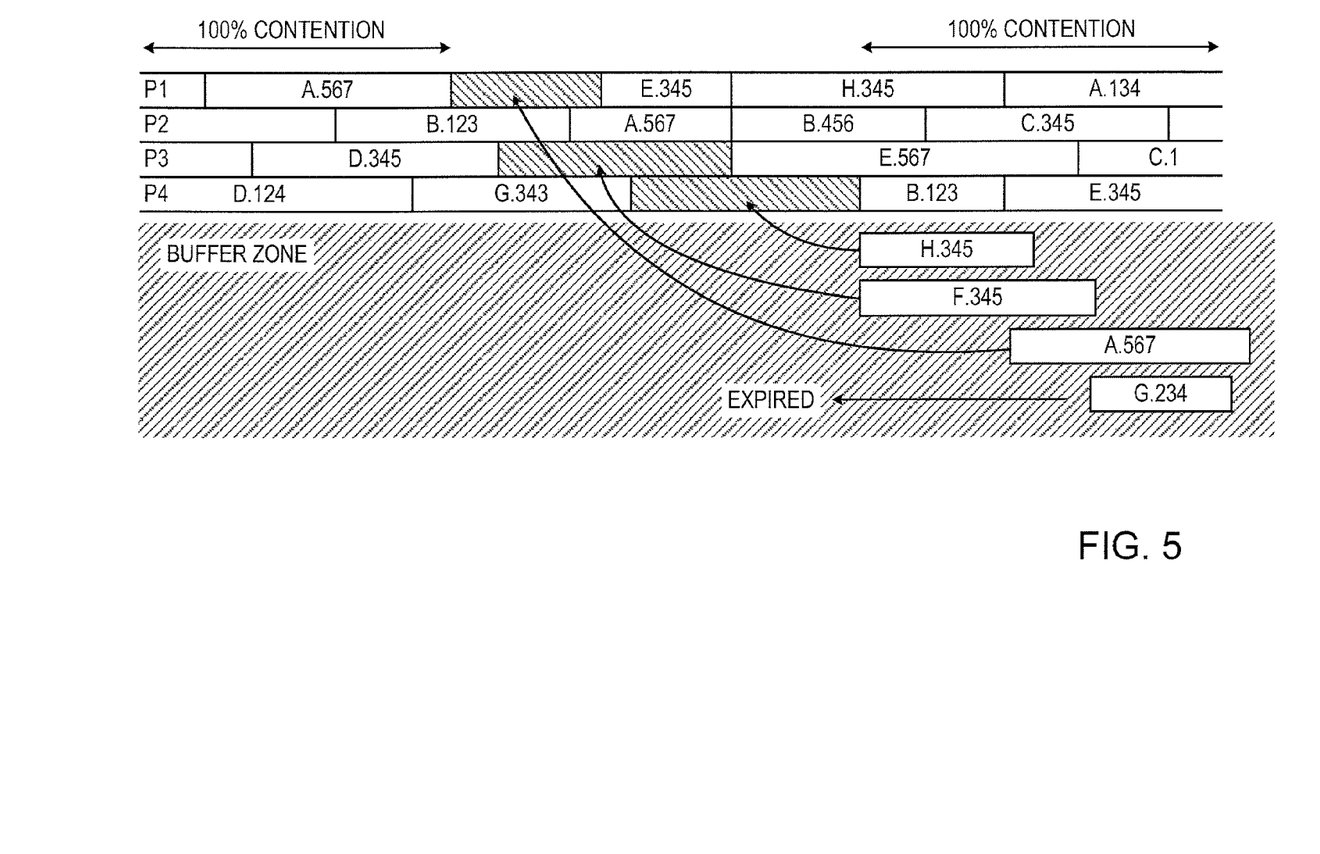
FIG. 5 is a simplified depiction of events from the system of FIG. 1 being buffered in case of contention.

As mentioned above, where the number of source events is high, this can lead to events contending for inclusion in the dynamic multiplex. Reference is now made to FIG. 5, which is a simplified depiction of events from the system of FIG. 1 being buffered in case of contention.

As discussed above, in embodiments of the present invention, multiple events are typically delivered to the client device in parallel. It is appreciated that an end-user is not able to experience all these events at the same time. Thus, it is assumed that the multiple events are to be stored (typically in offline storage) rather than immediately consumed.

Because the multiple events are to be stored rather than immediately consumed, there is no direct expectation that events in the dynamic multiplex are running concurrently with the broadcast of the same events on their source channels. However, the events will typically not be available on the dynamic multiplex before the events are aired on their source channels. In point of fact, the events could be present concurrently on both the source channels and on the dynamic multiplex, or the events may become available on the dynamic multiplex at any point thereafter.

In practice, the availability of the events on the dynamic multiplex will be dependent on at least:
event priority;
multiplex capacity; and
competition for space by other events.

It is also appreciated that the present invention is neutral regarding the presence of additional downstream components which may change the nature of the dynamic multiplex. For example and without limiting the generality of the foregoing, an additional downstream component might be capable altering the events such that they are delivered faster or slower than real-time, or the due to regionalization, the multiplex may be modified downstream from the event packing.

In scenarios where events are contending for space in the dynamic multiplex, embodiments of the present invention are capable of deciding which events have the lowest priority and buffering the lowest priority events for inclusion in later gaps in the dynamic multiplex stream. Looking at the example in FIG. 5, there is 100% contention depicted at the beginning and at the end of the portion of the dynamic multiplex of pseudo-channels depicted. Further, events H.345, F.345, A.567 and G.234 are all depicted as excluded from the dynamic multiplex due to contention. As event A.567 has the highest priority, event A.567 is included in the dynamic multiplex in the first available gap of sufficient size. Likewise, event F.345, having the next highest priority is included in the next available gap of sufficient size. Event H.345, having a still lower priority is included in the dynamic multiplex at a subsequent gap of sufficient size. Finally, event G.234, having been delayed for so long that it is no longer sensible to include event 6,234 in the dynamic multiplex, is discarded as expired. The expiration period can be specified on a per-event basis and is likely to be contextual to the actual content within the event.

It will be clear to those skilled in the art that the contention resolution system described above relies upon the eventuality that sufficiently sized gaps will become available in the multiplex and that the priorities are distributed evenly enough such that such-decisions can be made.

It is appreciated that the contention resolution system of the present invention will keep sufficient records and affidavits of its decision such that the broadcaster has complete records of which events were included on which multiplex and at what time. This is useful in relation to advertising, where audience measurement organizations typically provide minute-by-minute audience measurement figures. The broadcaster collates this audience measurement information against "as run" logs to work out exactly what was on air for these audience measurement figures. Moreover, channel operators may ask that certain events be included in the system but as described above, some events may be crowded out due to contention. By keeping sufficient records, the system is able to keep track of which events were included in the multiplex and when they were broadcast in the multiplex, or which events expired before being broadcast, the reasons for excluding an event from a multiplex etc.

Figure 6:
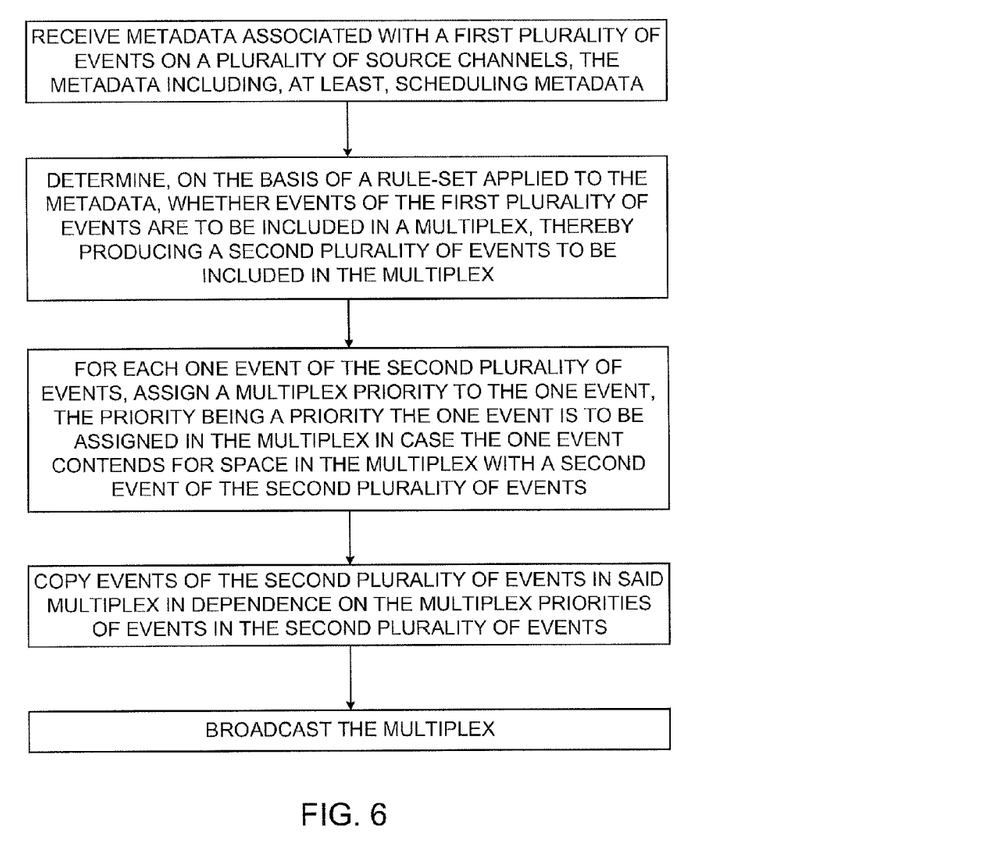
FIG. 6 is a simplified flowchart of a method of operation of the system of FIG. 1.
Figure 7:
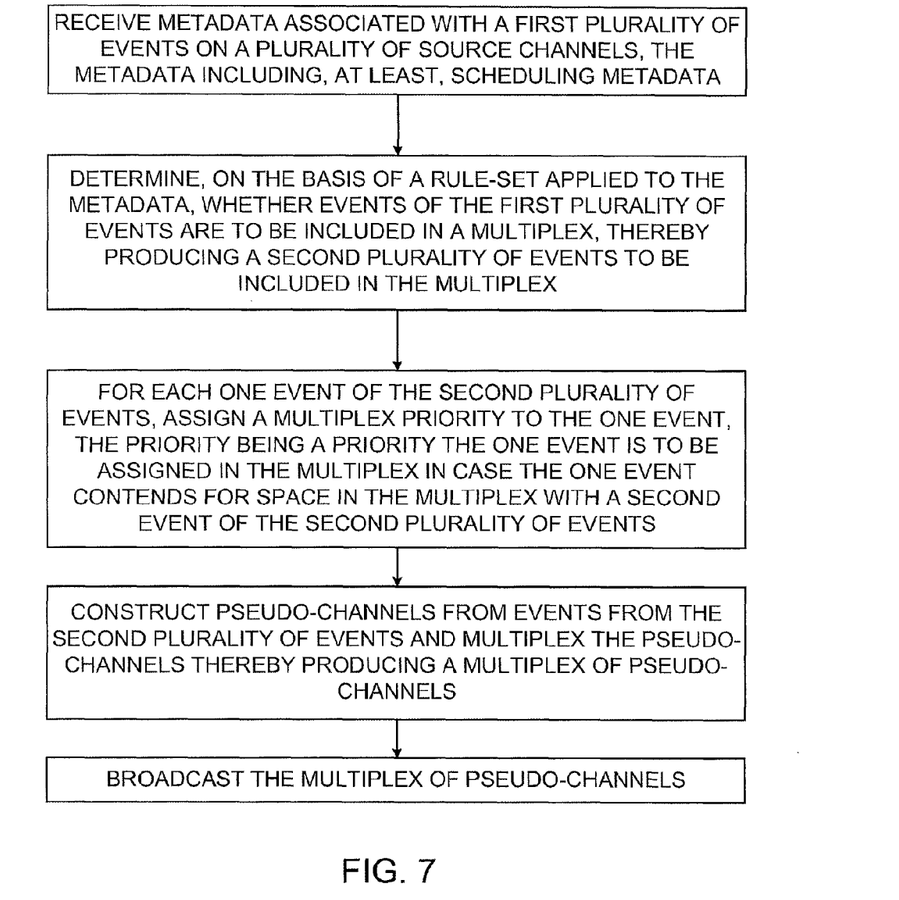
FIG. 7 is a simplified flowchart of a further method of operation of the system of FIG. 1.

Reference is now made to FIG. 6 and FIG. 7, which are simplified flowcharts of methods of operation of the system of FIG. 1. The methods of FIG. 6 and FIG. 7 are believed to be self explanatory with reference to the above discussion.

A new headend component has been described that is operable to dynamically construct a multiplex based upon event level metadata. The component is typically sited in a broadcast headend and is able to control the flow of source streams (channels) whose individual events may be included in the dynamic multiplex. The component is typically operable to 'branch off' streams, such that the streams flow into the dynamic multiplex for a set period of time. The component typically has access to metadata that describes the events broadcast on the source streams; and stores a configurable 'rule set' that defines a function allowing the component to make event level decisions about which events to include in the multiplex. The input into the function is event level metadata; the output is a decision as to whether an individual event is to be included in the dynamic multiplex and with what priority. When capacity in the dynamic multiplex is exceeded, the component is operable to prioritize events based upon the output of the rule set. The component is also typically operable to store and slip lower priority events into later gaps in the dynamic multiplex.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for dynamically constructing a broadcast television multiplex, from a plurality of source television channels, the method comprising:

receiving metadata associated with a first plurality of events on a plurality of source television channels, the metadata including, at least, scheduling metadata indicating when specific events scheduled for broadcast on the respective source television channels are starting and stopping;

selecting, on the basis of a rule-set applied to the metadata, whether events of the first plurality of events are to be included in said broadcast television multiplex, thereby producing a selected second plurality of events to be included in the broadcast television multiplex;

for each one event of the selected second plurality of events, assigning a multiplex priority to the one event, the multiplex priority being a priority the one event is to be assigned in the broadcast television multiplex in case the one event contends for space in said broadcast television multiplex with a second event of the second plurality of events;

constructing said broadcast television multiplex by copying events from said second plurality of events into said broadcast television multiplex at the time that the scheduled broadcast of the events begin and in dependence on the multiplex priorities only (a) when events in said second plurality of events are contended for space and overlap temporally at the time of their broadcast, or (b) to fill a gap in the multiplex created when the multiplex is constructed with less than 100% contention among respective events in said second plurality of events that overlap temporally at the time of their broadcast, wherein respective events are contending for space in (a), an event having a higher priority is copied into the multiplex before an event having a lower priority with the event having the lower priority being buffered for possible inclusion in a later gap in the multiplex, and wherein when events are contending for space in (b), an event having a highest priority is included in a next available gap of sufficient size; and broadcasting the broadcast television multiplex.

2. The method according to claim 1 and further comprising:

discarding an event which has been deferred for inclusion in said multiplex as a result of a contention for space in said multiplex.

3. The method according to claim 1 and further comprising:

time-slipping an event which has been deferred for inclusion in said multiplex as a result of a contention for space in said multiplex into a later occurring gap in said multiplex.

4. The method of claim 1, wherein said copying events from said second plurality of events into said multiplex comprises constructing pseudo-channels from events from said second plurality of events and multiplexing said pseudo-channels thereby producing a multiplex of pseudo-channels; and said broadcasting comprises broadcasting said multiplex of pseudo-channels.

5. The method of claim 4, wherein the multiplex of pseudo-channels is received by a client device such that each of the second plurality of events on a pseudo-channel in said multiplex of pseudo-channels is received on at least one channel of the plurality of source channels prior to the broadcasting of the multiplex of pseudo-channels.

6. The method of claim 1, wherein said rule-set comprises requests from an author of the rule-set for specific events of the first plurality of events to be included in said multiplex.

7. The method of claim 1, wherein said rule-set comprises requests that all events on a specific source channel and/or all events scheduled for broadcast between certain times be included in said multiplex.

8. The method of claim 1, wherein said rule-set comprises requests that all events of a specified genre, or all events in a specified series, or all events associated with specified proceedings, or all live broadcast events be included in said multiplex.

9. The method of claim 1, wherein the step of constructing said broadcast television multiplex comprises:
   prioritizing inclusion of events based on the multiplex priority when said events in said second plurality of events are contending for space; and
   for an event which has been deferred for inclusion in said broadcast television multiplex as a result of a contention for space in said broadcast television multiplex either;
   (a) time-slipping the event into a later occurring gap in said broadcast television multiplex if inclusion of the event in the broadcast television multiplex is not delayed beyond an expiration period; or
   (b) discarding the event if inclusion of the event in the broadcast television multiplex is delayed beyond the expiration period.

10. Apparatus for dynamically constructing a broadcast television multiplex from a plurality of source television channels, the apparatus comprising:
   receiving means for receiving metadata associated with a first plurality of events on a plurality of source channels, the metadata including, at least, scheduling metadata indicating when specific events scheduled for broadcast on the respective source television channels are starting and stopping;
   selecting means for selecting, on the basis of a rule-set applied to the metadata, including the scheduling metadata, which events of the first plurality of events are to be included in said multiplex, thereby producing a second plurality of events to be included in the multiplex;
   assigning means for assigning priority only as between events selected by the selecting means such that, for each one event of the second plurality of events, a multiplex priority is assigned to the one event, the multiplex priority being a priority the one event is to be assigned in the multiplex in case the one event contends for space in said multiplex with a second event of the second plurality of events;
   constructing means for constructing said broadcast television multiplex by copying events from said second plurality of events into said multiplex at the time that the scheduled broadcast of the events begin and in dependence on the multiplex priorities only (a) when events in said second plurality of events assigned by the assigning means are contending for space and overlap temporally at the time of their broadcast or (b) to fill a gap in the multiplex created when the multiplex is constructed with less than 100% contention among respective events in said second plurality of events that overlap temporally at the time of their broadcast, wherein when respective events are contending for space in (a), the constructing means copies an event having a higher priority into the multiplex before an event having a lower priority and buffers the event having the lower priority for possible inclusion in a later gap in the multiplex, and wherein when events are contending for space in (b), the constructing means includes an event having a highest priority in a next available gap of sufficient size in the multiplex; and
   broadcasting means for broadcasting the broadcast television multiplex.

11. The apparatus of claim 10, wherein the constructing means is operative to prioritize inclusion of events based on the multiplex priority when the events in said second plurality of events are contending for space such that, for an event which has been deferred for inclusion in said broadcast television multiplex as a result of a contention for space in said broadcast television multiplex, the constructing means is operative either:
   (a) to time-slip the event into a later occurring gap in said broadcast television multiplex if inclusion of the event in the broadcast television multiplex is not delayed beyond an expiration period; or
   (b) to discard the event if inclusion of the event in the broadcast television multiplex is delayed beyond the expiration period.

12. Apparatus for dynamically constructing a broadcast television multiplex from a plurality of source television channels, the apparatus comprising:
   a receiver configured for receiving metadata associated with a first plurality of events on a plurality of source channels, the metadata including, at least, scheduling metadata indicating when specific events scheduled for broadcast on the respective source television channels are starting and stopping;
   a selector configured for selecting, on the basis of a rule-set applied to the metadata, including the scheduling metadata, which events of the first plurality of events are to be included in said multiplex, thereby producing a second plurality of events to be included in the multiplex;
   an assignor configured for assigning priority only as between events selected by the selecting means such that, for each one event of the second plurality of events, a multiplex priority is assigned to the one event, the multiplex priority being a priority the one event is to be assigned in the multiplex in case the one event contends for space in said multiplex with a second event of the second plurality of events;
   a constructor configured for constructing said broadcast television multiplex by copying events from said second plurality of events into said multiplex at the time that the scheduled broadcast of the events begin and in dependence on the multiplex priorities only (a) when events in said second plurality of events assigned by the assigning means are contending for space and overlap temporally at the time of their broadcast or (b) to fill a gap in the multiplex created when the multiplex is constructed with less than 100% contention among respective events in said second plurality of events that overlap temporally at the time of their broadcast, wherein when respective events are contending for space in (a), the constructor copies an event having a higher priority into the multiplex before an event having a lower priority and buffers the event having the lower priority for possible inclusion in a later gap in the multiplex, and wherein when events are contending for space in (b), the constructor includes an event having a highest priority in a next available gap of sufficient size in the multiplex; and
   a broadcaster configured for broadcasting the broadcast television multiplex.

13. The apparatus of claim 12, wherein the constructor is operative to prioritize inclusion of events based on the multiplex priority when events in said second plurality of events are contending for space such that, for an event which has been deferred for inclusion in said broadcast television multiplex as a result of a contention for space in said broadcast television multiplex, the constructor is operative either:
   (a) to time-slip the event into a later occurring gap in said broadcast television multiplex if inclusion of the event in the broadcast television multiplex is not delayed beyond an expiration period; or
   (b) to discard the event if inclusion of the event in the broadcast television multiplex is delayed beyond the expiration period.

* * * * *

UNITED STATES PATENT AND TRADEMARK OFFICE
CERTIFICATE OF CORRECTION

PATENT NO. : 9,232,267 B2  
APPLICATION NO. : 13/393574  
DATED : January 5, 2016  
INVENTOR(S) : Alex Ashley et al.

It is certified that error appears in the above-identified patent and that said Letters Patent is hereby corrected as shown below:

IN THE SPECIFICATION

Column 1, line 8, "2010" to read as --2010 entitled--.

Column 1, line 11, "Number 2011/030236" to read as --Number WO 2011/030236--.

Column 2, line 10, "Application." to read as --Application--.

Column 2, line 10, "Tiernan." to read as --Tiernan--.

Column 6, line 26, "metadata." to read as --metadata--.

Column 8, line 49, "6,234" to read as --G.234--.

Column 8, line 57, "such- decisions" to read as --such decisions--.

IN THE CLAIMS

Column 9, line 55, Claim 1, "multiplex," to read as --multiplex--.

Column 10, line 14, Claim 1, "contended" to read as --contending--.

Column 10, line 20, Claim 1, "wherein respective" to read as --wherein when respective--.

Column 11, line 4, Claim 9, "when said events" to read as --when events--.

Column 11, line 8, Claim 9, "either;" to read as --either:--.

Column 11, line 60, Claim 11, "when the events" to read as --when events--.

Column 12, line 51, Claim 13, "claim 12,wherein" to read as --claim 12, wherein--.

Signed and Sealed this  
Nineteenth Day of April, 2016

Michelle K. Lee  
*Director of the United States Patent and Trademark Office*